(12) United States Patent
Van Asseldonk et al.

(10) Patent No.: US 9,451,065 B2
(45) Date of Patent: Sep. 20, 2016

(54) ADAPTIVE PLUG FOR EDGE PROTECTION

(71) Applicant: Apple Inc., Cupertino, CA (US)

(72) Inventors: Brandon J. Van Asseldonk, Cupertino, CA (US); Brett A. Rosenthal, Cupertino, CA (US); Chien-Ming Huang, Shenzhen (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/244,297

(22) Filed: Apr. 3, 2014

(65) Prior Publication Data

US 2015/0289395 A1    Oct. 8, 2015

(51) Int. Cl.
*H04M 1/02* (2006.01)

(52) U.S. Cl.
CPC ......... *H04M 1/0274* (2013.01); *H04M 1/0249* (2013.01); *Y10T 29/4998* (2015.01)

(58) Field of Classification Search
CPC ...... B65D 7/42; B29C 39/22; H05K 5/0086; H04M 1/03; H04M 1/0202; H04M 1/0249; H04M 1/0274
USPC .................. 312/223.1, 223.2; 205/118, 131; 455/575.1; 379/428.01, 440; 29/530, 29/527.6, 526.4; 428/67
See application file for complete search history.

(56) References Cited

U.S. PATENT DOCUMENTS

| | | | |
|---|---|---|---|
| 2,859,510 A | 11/1958 | Baxa | |
| 4,911,796 A * | 3/1990 | Reed | H05K 3/0008 205/125 |
| 5,028,075 A | 7/1991 | Donnelly | |
| 5,280,819 A | 1/1994 | Newkirk et al. | |
| 5,779,218 A * | 7/1998 | Kowanz | 251/129.06 |
| 5,843,117 A | 12/1998 | Alt et al. | |
| 6,149,506 A | 11/2000 | Duescher | |
| 6,183,347 B1 | 2/2001 | Shaw | |
| 6,453,783 B2 | 9/2002 | Yu et al. | |
| 6,464,080 B1 | 10/2002 | Morris et al. | |

(Continued)

FOREIGN PATENT DOCUMENTS

| | | |
|---|---|---|
| JP | 60244493 | 12/1985 |
| WO | WO03/002289 | 1/2003 |
| WO | WO2012/007755 | 1/2012 |

OTHER PUBLICATIONS

Author Unknown, "Laboratory Instruments," http://www.mocon.com, 2 pages, at least as early as Oct. 12, 2012.

(Continued)

*Primary Examiner* — James O Hansen
(74) *Attorney, Agent, or Firm* — Brownstein Hyatt Farber Schreck, LLP

(57) ABSTRACT

Housings for electronic devices including adaptive plugs, and the use of adaptive plugs in methods of manufacturing housings. The housing may include an opening, and an adaptive plug releasably positioned within the opening. A method of forming a housing may include forming an opening within the housing, disposing a curable material within the opening of the housing, and curing the material to form an adaptive plug. The adaptive plug may be positioned within the opening of the housing. The method may also include performing at least one surface treatment on the housing. A method of protecting an edge of an opening in a housing may include providing the housing including the opening, forming an adaptive plug within the opening of the housing, and forming a barrier on the edge of the opening using the adaptive plug.

21 Claims, 11 Drawing Sheets

(56) References Cited

U.S. PATENT DOCUMENTS

| | | |
|---|---|---|
| 6,517,995 B1 | 2/2003 | Jacobson et al. |
| 6,811,136 B2 * | 11/2004 | Eberhardt et al. ....... 251/129.06 |
| 7,122,057 B2 | 10/2006 | Beam et al. |
| 7,540,697 B2 | 6/2009 | Wang et al. |
| 7,582,175 B2 | 9/2009 | Trejo-Rincon |
| 7,597,483 B2 | 10/2009 | Simmons et al. |
| 7,685,676 B2 | 3/2010 | McClellan |
| 8,015,852 B2 | 9/2011 | Su |
| 8,052,743 B2 | 11/2011 | Weber et al. |
| 8,066,251 B2 | 11/2011 | Brown |
| 8,252,379 B2 | 8/2012 | Nagashima |
| 8,994,608 B2 * | 3/2015 | Russell-Clarke et al. .... 343/873 |
| 2005/0064345 A1 | 3/2005 | Oyake |
| 2006/0008616 A1 | 1/2006 | Dean et al. |
| 2006/0097127 A1 | 5/2006 | Firth |
| 2007/0039691 A1 | 2/2007 | Mroz |
| 2007/0175015 A1 * | 8/2007 | Ainsworth ................... 29/524.1 |
| 2008/0206509 A1 | 8/2008 | Kent et al. |
| 2008/0257006 A1 | 10/2008 | Durney et al. |
| 2008/0312727 A1 | 12/2008 | Blank |
| 2009/0014118 A1 | 1/2009 | Ratcliffe |
| 2009/0043228 A1 | 2/2009 | Northrop et al. |
| 2011/0041553 A1 | 2/2011 | Xiong et al. |
| 2011/0156361 A1 | 6/2011 | Ghalambor et al. |
| 2011/0267773 A1 | 11/2011 | MacFarlane |
| 2013/0216740 A1 | 8/2013 | Russell-Clarke et al. |
| 2013/0251934 A1 | 9/2013 | Caracciolo et al. |
| 2013/0291367 A1 | 11/2013 | Russell-Clarke et al. |
| 2014/0082926 A1 | 3/2014 | Tam et al. |
| 2014/0102162 A1 | 4/2014 | Morgenstern et al. |

OTHER PUBLICATIONS

Author Unknown, "Stewmac Inlay Tools and Materials," http://web.archirve.org/...op/Inlay,_pearl/Tools_and_supplies_for:_Inlay,_pearl_cutting/Carbide_Downcut_Inlay_Router_Bits.html, 5 pages, at least as early as Dec. 4, 2013.

* cited by examiner

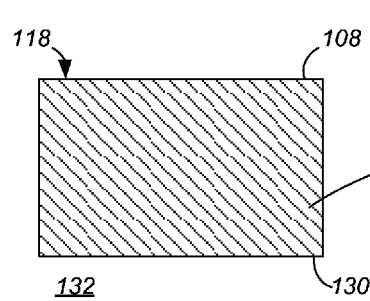
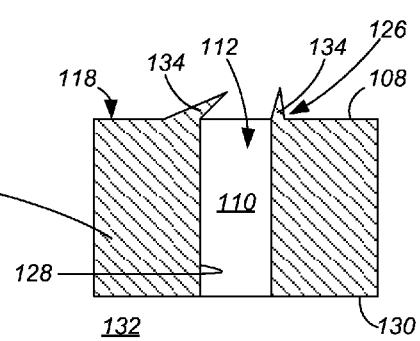
FIG. 4A          FIG. 4B
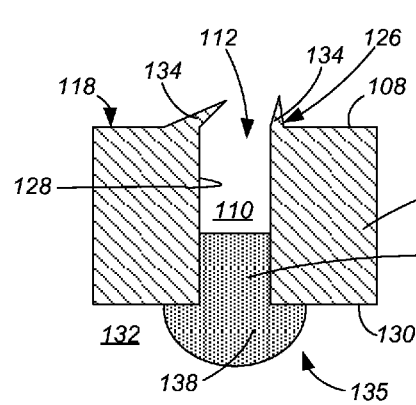
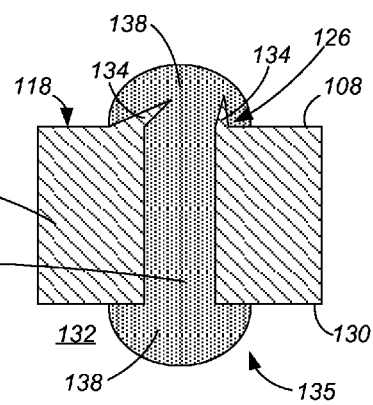
FIG. 4C          FIG. 4D

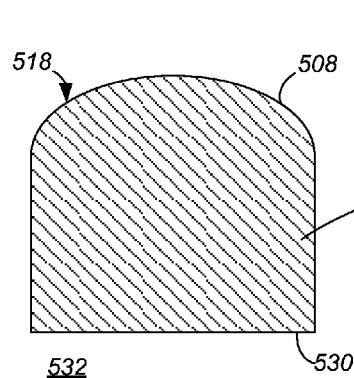
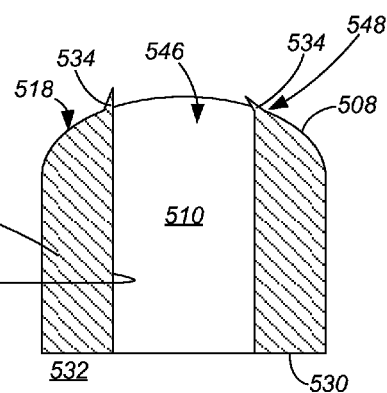
FIG. 6A                FIG. 6B
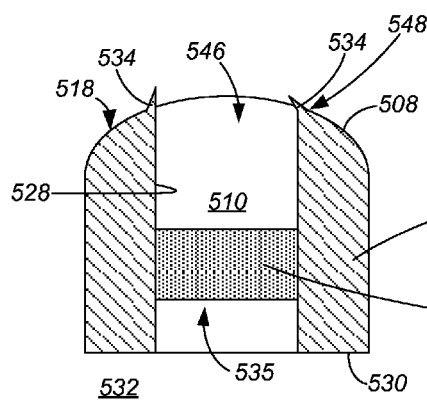
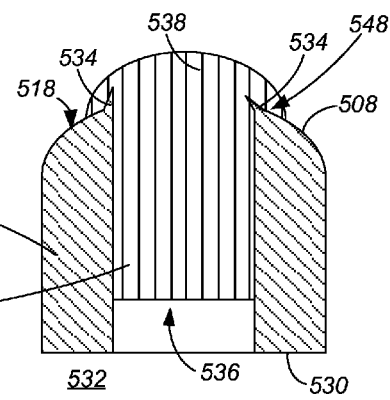
FIG. 6C                FIG. 6D

ADAPTIVE PLUG FOR EDGE PROTECTION

TECHNICAL FIELD

The disclosure relates generally to housings for electronic devices, and more particularly, to housings for electronic devices including adaptive plugs, and the use of adaptive plugs in methods of manufacturing housings for electronic devices.

BACKGROUND

When manufacturing component housings, the tolerance and/or dimensions of the various parts of the housing are very important. For example, when manufacturing a housing for an electronic device, the various apertures of the housing may require very specific and detailed tolerances and/or dimensions. These specific tolerances and/or dimensions may be dependent on the functionality and/or the aesthetic appeal of the apertures. The apertures for the housing of the electronic device may require an edge that is substantially smooth (e.g., rounded) or substantially sharp (e.g., abrupt transition between surfaces). When it is desired that the edge of the apertures in the housing be smooth or rounded, the apertures and/or the edge may not require additional care or protection when processing the housing. That is, the edge of the apertures may be substantially exposed to surface treatment processes (e.g., grinding, polishing, buffing) performed on the housing and the surface including the apertures. As a result, in addition to performing surface treatment processes on the cosmetic surface of the housing and/or removing burs formed during the formation process of the apertures within the housing, the surface treatments processes performed on the housing may also smooth-out or round the edge of the apertures by removing a portion of the material forming the housing.

However, when it is desired that the edge of the apertures in the housing be substantially sharp, the apertures and/or the edge of the apertures may need to be protected when performing surface treatment processes on the housing. Conventional processes for protecting the edge of the apertures include utilizing a mechanical fitting to be positioned within the apertures. More specifically, after the aperture is formed within the housing and the burs formed on the surface around the aperture are removed from the housing, a mechanical fitting is inserted within the aperture to protect the edge of the aperture during subsequent processing of the housing.

Ideally, the fitting may prevent subsequent surface treatment processes (e.g., grinding, polishing, buffing) from removing material of the housing on the edge of the aperture. However, like the apertures of the housing, each mechanical fitting includes a specific tolerance. Where the dimensions for the aperture of the housing and/or the mechanical fitting are not within the desired tolerance, the mechanical fitting may not sufficiently protect the edge of the aperture. For example, where the length or diameter of the mechanical fitting is below the desired tolerance and/or the corresponding feature of the aperture of the housing is above the desired tolerance, the edge of the aperture may not be completely protected by the fitting. As a result, the subsequent surface treatments processes performed on the housing may undesirable remove material from the aperture's edge, which is not completely protected by the mechanical fitting. Conversely, where the mechanical fitting is above the desired tolerance and/or the aperture of the housing is below the desired tolerance, the mechanical fitting may create a shadow defect on the housing during subsequent processing or, may not fit in the aperture at all. A mechanical fitting may be custom made to ensure proper fit and/or edge protection for each housing utilizing a fitting. However, this process may be very time consuming and very expensive, especially when it is desired to produce high volumes of the housing including the aperture.

SUMMARY

Generally, embodiments discussed herein are related to housings for electronic devices including adaptive plugs, methods for forming housings for electronic devices using adaptive plugs, and methods for protecting openings in housings for electronic devices using adaptive plugs. The adaptive plug utilized within the housings may include a curable material that may be disposed within an opening of the housing and subsequently cured within the opening and/or on a portion of the housing. By including a material that may be cured within the opening, the adaptive plug may be custom fit to any opening of the housing. That is, because of the process and/or material used to form the adaptive plug, the adaptive plug may completely protect the opening and/or the opening's edge of the housing, no matter the dimensions and/or tolerance of the opening in the housing. This may substantially ensure that the opening and/or the opening's edge is protected when performing subsequent surface treatment processes on the housing. Additionally, the adaptive plug may be utilized in automated processes for forming the housing including the opening. As such, the adaptive plug may provide a desired protection when processing the housing, while performing processes for producing high volumes of housings.

One embodiment may include a housing. The housing may include an opening formed within the housing, and an adaptive plug releasably positioned within the opening.

Another embodiment may include a method of forming a housing. The method may include forming an opening within the housing, disposing a curable material within the opening of the housing, and curing the material to form an adaptive plug. The adaptive plug may be positioned within the opening of the housing. The method may also include performing at least one surface treatment on the housing.

A further embodiment may include a method of protecting an edge of an opening in a housing. The method may include providing the housing including the opening, and forming an adaptive plug within the opening of the housing. The adaptive plug may include a curable material. The method may also include forming a barrier on the edge of the opening using the adaptive plug.

BRIEF DESCRIPTION OF THE DRAWINGS

The disclosure will be readily understood by the following detailed description in conjunction with the accompanying drawings, wherein like reference numerals designate like structural elements, and in which:

FIGS. 4A-4J show illustrative cross-section views of a housing for an electronic device, undergoing processes of forming as depicted in FIGS. 2 and 3, according to embodiments. The cross-section views of the housing for the electronic device are taken along line 4A-4J in FIG. 1B.

FIGS. 6A-6G show illustrative cross-section views of a housing for an electronic device, undergoing processes of forming as depicted in FIGS. 2 and 3, according to additional embodiments. The cross-section views of the housing for the electronic device are taken along line 6A-6G in FIG. 5B.

Figure 1A:
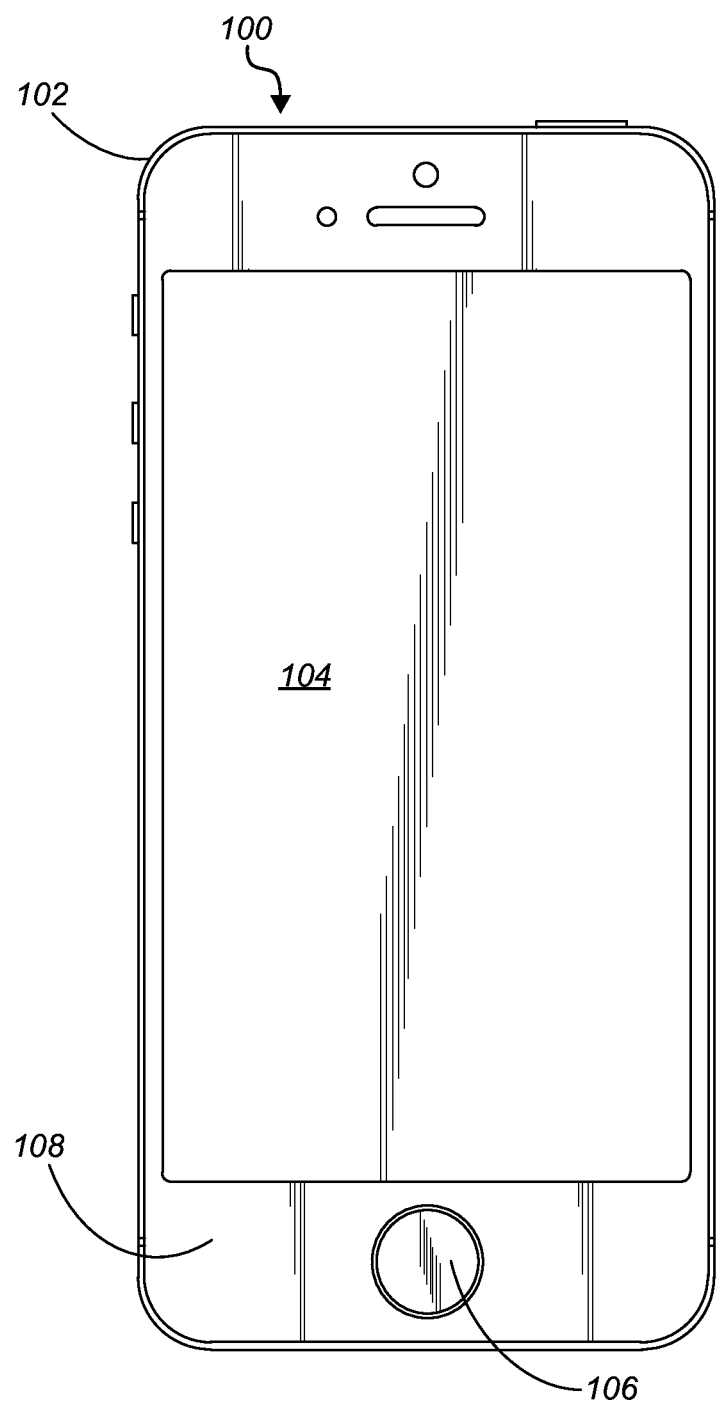
FIG. 1A shows an illustrative front view of an electronic device according to embodiments.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims The following disclosure relates generally to housings for electronic devices, and more particularly, to housings for electronic devices including adaptive plugs, and the use of adaptive plugs in methods of manufacturing housings for electronic devices.

The adaptive plug utilized within the housings may include a curable material that may be disposed within an opening of the housing and subsequently cured within the opening and/or on a portion of the housing. By including a material that may be cured within the opening, the adaptive plug may be custom fit to any opening of the housing. That is, because of the process and/or material used to form the adaptive plug, the adaptive plug may completely protect the opening and/or the opening's edge of the housing, independent of the dimensions and/or tolerance of the opening in the housing. This may substantially ensure that the opening and/or the opening's edge is protected when performing subsequent surface treatment processes on the housing. Additionally, the adaptive plug may be utilized in automated processes for forming the housing including the opening. As such, the adaptive plug may provide a desired protection when processing the housing, while performing processes for producing high volumes of housings.

These and other embodiments are discussed below with reference to FIGS. 1A-6G. However, those skilled in the art will readily appreciate that the detailed description given herein with respect to these Figures is for explanatory purposes only and should not be construed as limiting.

FIG. 1A shows an illustrative front view of one example of an electronic device 100, according to embodiments. In the illustrated embodiment, electronic device 100 is implemented as a smart telephone. Other embodiments can implement electronic device 100 differently, such as, for example, as a laptop or desktop computer, a tablet computing device, a gaming device, a display, a digital music player, a wearable computing device or display, a health monitoring device, and so on.

Electronic device 100 includes a housing 102 at least partially surrounding a display 104 and one or more buttons 106 or input devices. More specifically, as shown in FIG. 1A, electronic device 100 may include display 104 and button 106 formed on a front or outer surface 108 of housing 102. Housing 102 can form outer surface 108 or partial outer surface 108 and protective case for the internal components of the electronic device 100, and may at least partially surround display 104. Housing 102 can be formed of one or more components operably connected together, such as a front piece and a back piece. Alternatively, housing 102 can be formed of a single piece operably connected to display 104. Additionally, housing 102 may be formed from a variety of material including, but not limited to: aluminum, stainless steel, ceramic zirconia, and precious metals, including gold, silver, and platinum.

Display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. Button 106 can take the form of a home button, which may be a mechanical button, a soft button (e.g., a button that does not physically move but still accepts inputs), an icon or image on a display, and so on. Further, in some embodiments, button 106 can be integrated as part of a cover glass of electronic device 100.

Figure 1B:
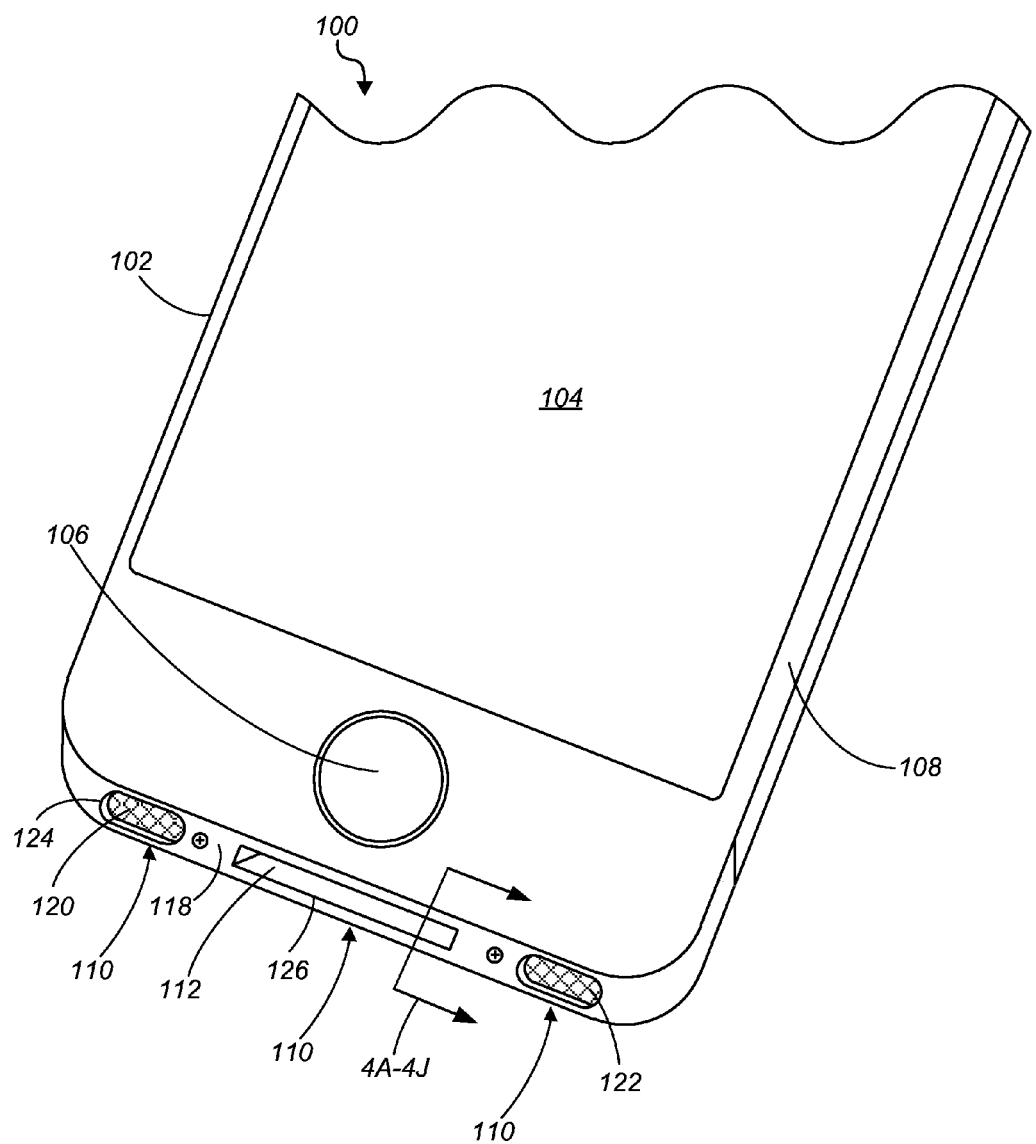
FIG. 1B shows an illustrative perspective view of the electronic device of FIG. 1A, according to embodiments.

Turning to FIG. 1B, an illustrative perspective view of a portion of electronic device 100 is shown according to embodiments. Electronic device 100 may also include a plurality of openings 110 formed through housing 102. Openings 110 in housing 102 of electronic device 100 may provide access from external components of electronic device 100 to internal components. As discussed herein, openings 110 formed in housing 102 may be formed directly through outer surface 108 of housing 102 using conventional material removal processes including, but not limited to: drilling, milling, cutting, and grinding. Additionally, as discussed herein, openings 110 formed in housing 102 may be configured in a variety of conventional shapes (e.g., circle, oval, polygon, etc.), as well as custom shapes or designs (e.g., crescent, star, cross, etc.).

In a non-limiting example, as shown in FIG. 1B, electronic device 100 may include a battery charging port 112 included in housing 102. More specifically, battery charging port 112 may include opening 110 formed through a bottom portion 118 of housing 102. As shown in FIG. 1B, bottom portion 118 may include a substantially flat portion of outer surface 108 of housing 102. That is, bottom portion 118 may be substantially flat and may be included in outer surface 108 of housing 102. Battery charging port 112 may be configured to receive a portion of a charging device (not shown) for charging the battery (not shown) of electronic device 100. That is, battery charging port 112 positioned on bottom 118 of housing 102 may be in electronic communication with a battery (not shown) of electronic device 100 included within an internal cavity (see, FIGS. 4A-4J) of housing 102, and may be coupled to a charging device. The charging device may provide an electric current to electronic device 100 to substantially charge the battery positioned within housing 102 of electronic device 100.

Additional openings 110 formed in housing 102 of electronic device 100 may include additional components of electronic device 100. That is, as shown in FIG. 1B, bottom 118 of housing 102 may include a speaker 120 and a microphone 122 of electronic device 100 formed from openings 110. More specifically, two distinct openings 110 may be formed in bottom 118 on opposite sides of battery charging port 112, and may include speaker 120 and microphone 122 for electronic device 100, respectively. Speaker 120 may include any conventional speaker assembly utilized by electronic device 100 for projecting sound to a user of electronic device 100. Additionally, microphone 122 may include any conventional microphone system that may be utilized by electronic device 100 to receive audio input from a user of electronic device 100.

Openings 110 formed through housing 102 for the various components (e.g., battery charging port 112, speaker 120, microphone 122) of electronic device 100 may be formed with specific design features. More specifically, each opening 110 formed through outer surface 108 of housing 102 may be created to include specific dimensions, shapes, curvatures and/or tolerances. These specific design features may be dependent, at least in part, on the function and/or the aesthetics of the electronic device 100 and/or the component of the electronic device 100 that utilized the specific opening 110.

In a non-limiting example, as shown in FIG. 1B, opening 110 which forms speaker 120 of electronic device may include a substantially oval shape. Additionally, speaker edge 124 of opening 110 of speaker 120 may be substantially curved or rounded. That is, when forming housing 102 to include opening 110 for speaker 120, the speaker edge 124 of opening 110 may undergo surface treatments to substantially curve or round-out speaker edge 124 prior to speaker 120 being installed in electronic device 100 and/or electronic device 100 is made available to a user. As discussed herein, the surface treatments performed on housing 102 may include, but are not limited to: polishing, buffing, sand blasting, grinding, planing, and milling.

In the non-limiting example, opening 110 for speaker 120 of electronic device 100 may include a substantially curved or rounded speaker edge 124 as a result of speaker 120 being configured to provide an output signal (e.g., sound). That is, no external component may interact or contact speaker 120 formed in opening 110. As such, and for ease of manufacturing, opening 110 of speaker 120 may include a substantially curved or rounded speaker edge 124. It is understood, however, that curved edges for openings 110 formed in electronic device 100 may not be limited to openings 110 that may not interact and/or connect with external components of electronic device 100. That is, functionality may not be the only characteristic which determines the design features and specifics of openings 110 formed in electronic device 100. In an additional non-limiting embodiment, speaker edge 124 of opening 110 may include a sharp edge (e.g., abrupt transition between sidewall and outer surface 108) for speaker 120 of electronic device 100.

In another non-limiting example, opening 110 forming battery charging port 112 may include a port edge 126 that may be substantially sharp. As discussed herein, the term "substantially sharp" or "sharp edge" may be used interchangeably and may be understood as an edge that includes a substantially perpendicular or 90° transition between outer surface 108 of bottom portion 118 and sidewalls 128 (see, FIGS. 4B and 4C) of opening 110 forming battery charging port 112. In the non-limiting example, opening 110 forming battery charging port 112 may include substantially sharp port edge 126 as a result of functional design features and/or aesthetic design features. With respect to functional design features, opening 110 forming battery charging port 112 may include substantially sharp port edge 126 to aid in the coupling or mating of the charging device (not shown) to battery charging port 112. That is, by including a substantially sharp port edge 126 for battery charging port 112, the charging device may not easily become disconnected or be misaligned when being coupled to the electronic device 100. With respect to the aesthetic design feature, it may be desired to form substantially sharp port edge 126 for battery charging port 112 to continue the aesthetic design of "hard" or sharp edges for the entire electronic device 100.

Figure 2:
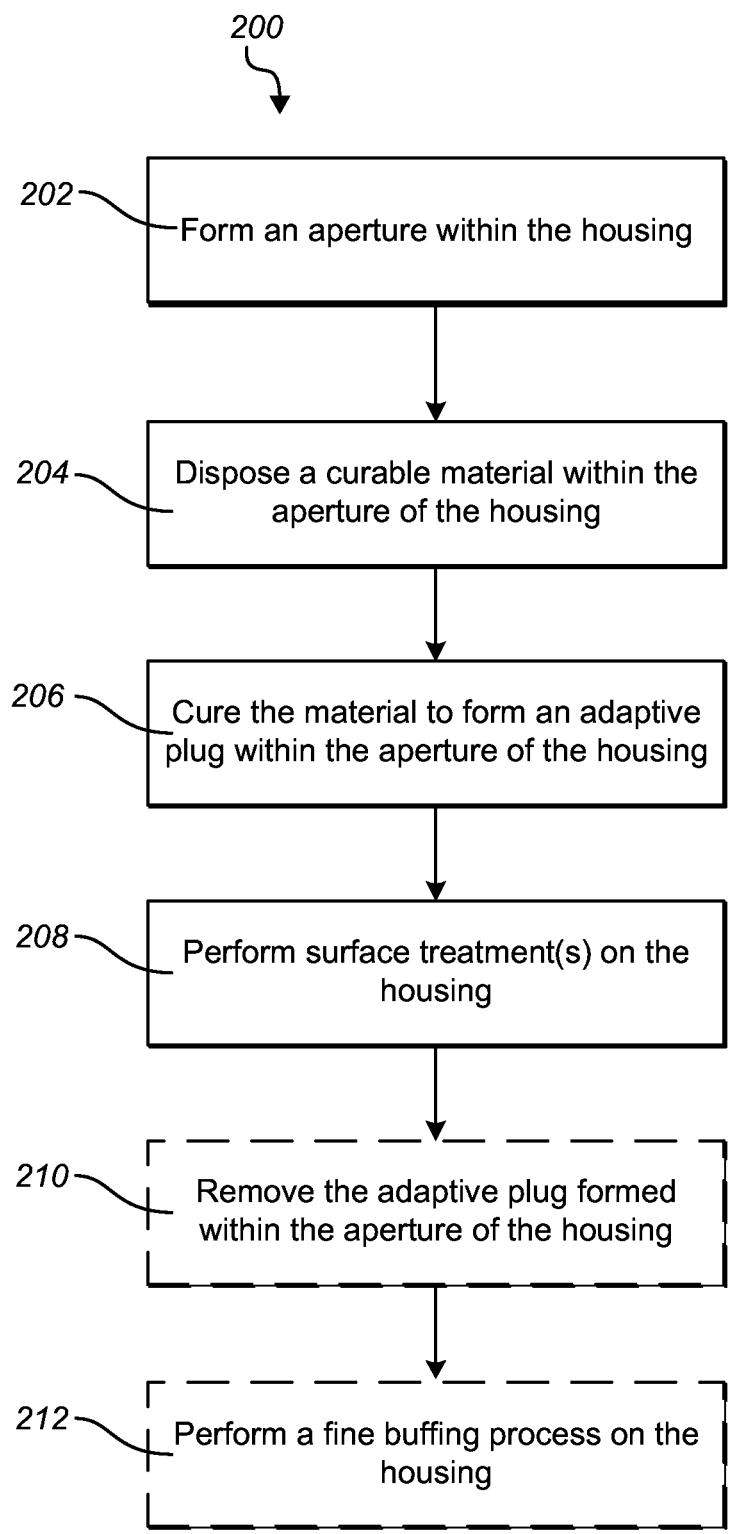
FIG. 2 is a flow chart illustrating a method of forming a housing for an electronic device using an adaptive plug.

Substantially sharp edges (e.g., port edge 126) for openings 110 of electronic device 100 may be formed using an adaptive plug (see, FIGS. 4E-4I) during the manufacturing of housing 102 of electronic device 100. Turning to FIG. 2, a process of forming housing 102 (see, FIG. 1B) using an adaptive plug, may now be discussed. Specifically, FIG. 2 is a flowchart for depicting a sample method 200 for form forming housing 102 using an adaptive plug.

In operation 202, an opening may be formed in a housing. More specifically, an opening may be formed completely through the body of the housing for an electronic device. The forming of the opening may include machining (e.g., drilling, cutting, milling) the opening through the housing from an inner surface of the housing to an outer surface of the housing. Additionally, by machining the opening through the housing, a bur may be formed on the outer surface of the housing, in alignment with the opening. That is, when opening is completely formed through outer surface of the housing via the machining process, a bur or undesirable, excess of material may be formed on the outer surface of the housing aligned with and/or adjacent to the opening.

Although the opening is discussed herein as being formed completely through the body of the housing for an electronic device, it is understood that the opening may not be formed completely though the housing. That is, in non-limiting examples, the opening my include a blindhole, a counter bore, or a recess formed or machined into the housing for the electronic device.

In operation 204, a curable material may be disposed within the opening formed within the housing. The curable material may be disposed within the opening formed with the housing by dispensing the curable material from the inner surface of the housing up to the outer surface of the housing. The curable material disposed within the opening formed within the housing may be substantially malleable or in liquid form. Thus, the curable material may take the shape and/or completely fill up the opening during the disposing process in operation 204. The disposing of the curable material within the opening of the housing in operation 204 may be accomplished using a variety of distinct processes. In non-limiting examples, the curable material may be sprayed within the opening of the housing, or the curable material may be locally applied within the opening of the housing. In an additional, non-limiting example, the curable material may be injection molded into the opening of the housing. In a further, non-limiting example, the housing, include the opening, may be immersed in a volume of the curable material, such that the curable material is positioned within and/or substantially fills the opening formed within the housing.

As discussed herein, the disposing of the curable material in operation 204 may also include forming a bead portion of the curable material disposed on an outer surface of the housing. The bead portion of the curable material may be coupled to the bur formed on the outer surface of the housing during operation 202. Additionally as discussed herein, bead portion may be formed on an inner surface of the housing as well. Bead portion may be formed on the inner surface dependent on a variety of factors including, but not limited to: to size or dimension of the opening, the shape of the opening, the material composition of the curing material (discussed herein), and the material composition of the housing. As discussed herein, the bead portion of the curable material may be formed by disposing an excess amount of the curable material within the opening, and allowing the excess curable material to flow out of the opening. Additionally as discussed herein, the bead portion formed from the excess portion of the curable material may be held on the surface of the housing by the surface tension of the opening and the surface and/or the viscosity properties of the curable material.

In operation 206, the curable material positioned within the opening of the housing may be cured to form an adaptive plug. The adaptive plug formed from the cured material may be positioned within the opening of the housing. The curing of the curable material may include curing the curable material positioned within the opening of the housing, as well as, curing the bead portion of the curable material formed on the outer surface of the housing, and where applicable, curing the bead portion of the curable material formed on the inner surface of the housing. As discussed herein, by curing the curable material positioned within the opening, the adaptive plug formed from the curable material may take the exact shape of the opening formed within the housing, and the bead portion of the curable material/adaptive plug may substantially surround the burs formed on the outer surface of the housing in operation 202.

As discussed herein, the curing of the curable material in operation 206 may be dependent on the material composition of the curable material. In a non-limiting example where curable material includes an ultraviolet (UV) curable material, the curing of the curable material in operation 206 may include exposing the UV curable material to a UV light. In an additional non-limiting example where curable material includes an thermo-curable material, the curing of the curable material in operation 206 may include increasing the temperature of the thermo-curable material.

Figure 3:
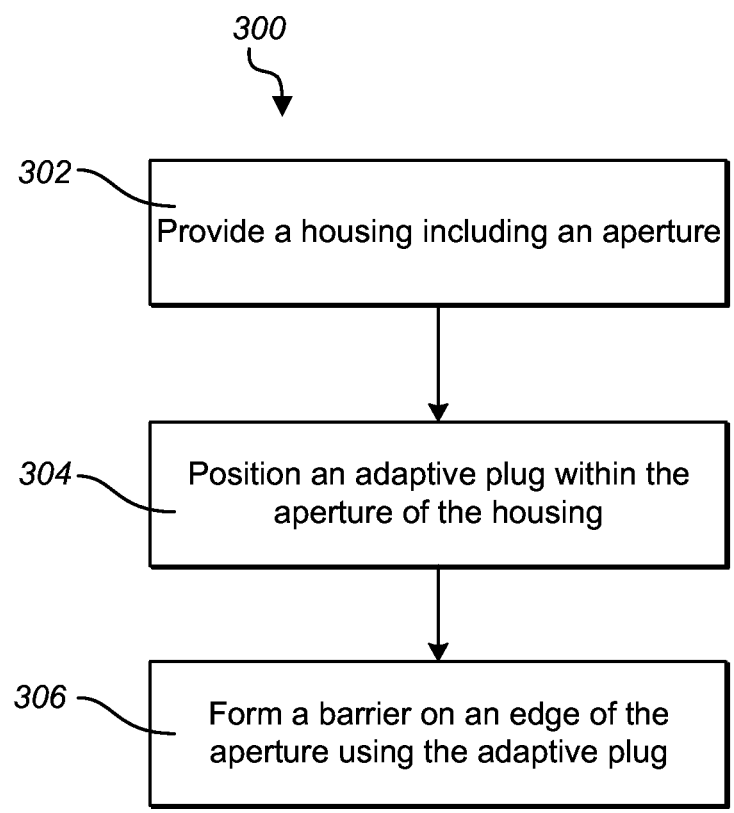
FIG. 3 is a flow chart illustrating a method of protecting an edge of an opening of an electronic device housing using an adaptive plug.

As discussed in detail herein with respect to FIG. 3, the curing, forming and/or positioning of the adaptive plug within the opening of the housing may aid in protecting and/or forming the sharp edge of the opening when forming the housing of the electronic device. That is, and as discussed herein, the adaptive plug formed in operation 206 may be substantially hard, and may be utilized in protecting and/or forming a sharp edge for the opening of the housing including the adaptive plug.

In operation 208, at least one surface treatment process may be performed on the housing. More specifically, at least one surface treatment process may be performed on the outer surface of the housing including the opening and the adaptive plug. The surface treatment(s) performed on the housing may include, but is not limited to, at least one of: polishing the outer surface of the housing, buffing the outer surface of the housing, and sand blasting the outer surface of the housing. The surface treatment(s) performed on the housing may also include removing the bur formed on the outer surface of the housing in operation 202, and removing the bead portion of the adaptive plug coupled to the bur, formed in operation 204. As discussed in detail with respect to FIG. 3, the adaptive plug positioned within the opening of the housing may substantially protect the edge of the opening formed on the outer surface of the housing by preventing the surface treatments performed in operation 208 from being performed on the edge itself. That is, the adaptive plug may protect the edge from the surface treatment(s) performed in operation 208, and may substantially maintain a sharp edge for the opening formed within the housing.

In optional operation 210, the adaptive plug formed or positioned within the opening of the housing may be removed. More specifically, the adaptive plug positioned within the opening of the housing may be removed through the inner surface of the housing. As discussed herein, the process of removing the adaptive plug from the opening of the housing may be dependent, at least in part, on the material composition of the curable material used to form the adaptive plug (e.g., operations 204, 206) and/or the material composition of the housing including the opening. In a non-limiting example, removing the adaptive plug formed within the opening of the housing may include burning the adaptive plug from the opening of the housing from the inner surface of the housing. In an additional non-limiting example, removing the adaptive plug formed within the opening of the housing may include: exposing the housing including the adaptive plug to a liquid to soften the adaptive plug; applying a force to the adaptive plug; and peeling the adaptive plug from the opening of the housing. In this non-limiting example, and as discussed herein, the force may be applied to the adaptive plug adjacent the outer surface of the housing by inserting a fastener or pin within the opening, to remove the adaptive plug through the inner surface of the housing.

In optional operation 212 (shown in phantom), a fine buffering process may be performed on the housing including the opening. More specifically, once the adaptive plug is removed from the opening of the housing, a fine or final buffering process may be performed on the outer surface of the housing. The fine buffering process may include a minimal or negligible amount of material removal from the outer surface of the housing, such that the sharp edge formed and/or protected by the adaptive plug may remain substantially sharp.

Turning to FIG. 3, a process of protecting an edge (e.g., port edge 126) of opening 110 in housing 102 (see, FIG. 1B) using an adaptive plug, may now be discussed. Specifically, and with continued reference to FIG. 2, FIG. 3 is a flowchart for depicting a sample method 300 for form and/or maintaining a substantially sharp edge for opening 110 of housing 102 using an adaptive plug.

In operation 302, a housing including an opening may be provided. More specifically, a housing including at least one opening may be provided, where the housing may be utilized by an electronic device. The opening included in the housing may be formed in a similar fashion as previously discussed herein with respect to operation 202 in FIG. 2. Additionally, the opening of the provided housing may include burs formed on an outer surface of the housing as a result of a process of forming the opening within the housing, as discussed above within respect to operation 202 in FIG. 2.

In operation 304, an adaptive plug may be formed within the opening of the housing. More specifically, the forming of the adaptive plug within the opening of the housing may include forming an opening portion of the adaptive plug within the opening and forming a bead portion of the adaptive plug on the outer surface of the housing, where the bead portion is coupled to the burs formed on the outer surface of the housing. The adaptive plug may include and/or be made from a curable material that may be disposed within the opening of the housing, and subsequently cured to form the adaptive plug, as similarly discussed herein within with respect to operations 204 and 206 in FIG. 2. In a non-limiting example where the adaptive plug includes a curable material, the forming of the adaptive plug within the opening of the housing may include disposing an arcrylated urethane within the opening of the housing. The disposed arcrylated urethane may be subsequently cured or hardened to form and/or position the adaptive plug within the opening of the housing.

In an additional non-limiting example, the positioning of the adaptive plug within the opening of the housing may include three-dimensionally (3D) printing the adaptive plug within the opening of the housing. Specifically, the provided housing including the opening may be positioned within a 3D printer system, and the 3D printer system may subsequently scan and provide, print or dispose a 3D printing material (e.g., thermoplastic, photopolymer) within the opening of the housing to form the adaptive plug. The 3D printer system may print or dispose the adaptive plug within the opening of the housing bases on the exact and/or specific dimensions of the opening, as determined when scanning the housing including the opening.

In operation 306, a barrier on the edge of the opening within the housing may be formed using the adaptive plug. More specifically, the forming of the barrier on the edge of the opening using the adaptive plug may include positioning the adaptive plug adjacent to, or substantially over the edge of the opening, and preventing the edge of the opening from being exposed to subsequent processing of the housing. That is, the adaptive plug may be positioned within the opening of the housing to substantially prevent the edge of the opening from being exposed to additional surface treatment processes that may remove material from the opening and/or the edge of the opening. As discussed herein, the removal of material from the edge of the opening may be unwanted where the edge of the opening formed through the housing may be designed and/or desired to be substantially sharp. The surface treatment processes for which the adaptive plug protects and/or forms the barrier for the edge of the opening within the housing may be substantially similar to those processes discussed in operation 208 of FIG. 2.

Turning to FIGS. 4A-4J, with continued reference to FIGS. 1A and 1B, a housing 102 undergoing various operations of method 200 of FIG. 2, and method 300 of FIG. 3 may be depicted. That is, FIGS. 4A-4J may depict the formation of battery charging port 112 in housing 102 for electronic device 100 (see, FIGS. 1A and 1B) using an adaptive plug (see, FIG. 4C), according to the method 200 of FIG. 2 and the method 300 of FIG. 3. FIGS. 4A-4J show an illustrative cross-section view of housing 102 of electronic device 100 taken along line 4A-4J in FIG. 1B. It is understood that similarly numbered components may function in a substantially similar fashion. Redundant explanation of these components has been omitted for clarity.

Figure 4E:
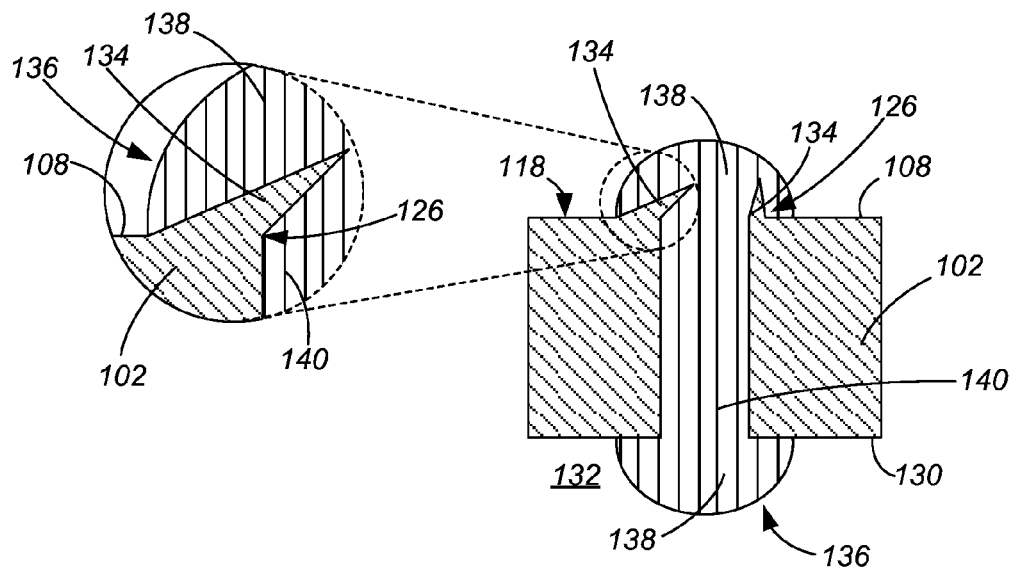

FIG. 4A shows a cross-sectional view of a portion of a material forming housing 102 of electronic device (see, FIG. 1A) prior to any processing. The portion of the material forming housing 102, as shown in FIG. 4A may form bottom portion 118 of housing 102. As discussed herein, bottom portion 118 may include outer surface 108 of housing 102. Additionally, as shown in FIG. 4A, housing 102 may include an inner surface 130 positioned opposite outer surface 108. Inner surface 130 of housing 102 may be positioned adjacent and/or substantially surround an internal cavity 132 for electronic device 100. As discussed herein, internal cavity 132 may contain all of the internal components of electronic device 100. In a non-limiting example, internal cavity 132 may include the battery (not shown) for electronic device 100 which may be configured to be electrically connected to a charging device (not shown) via battery charging port 112 (see, FIG. 4J) formed in housing 102. As discussed herein, the material used to form housing 102 for electronic device 100 may include aluminum, stainless steel, ceramic zirconia and precious metals, including gold, silver and platinum. In a non-limiting example, the material forming housing 102, as shown in FIGS. 4A-4J may be aluminum.

FIG. 4B shows housing 102 including opening 110. Opening 110 may be formed completely though housing 102. More specifically, opening 110 may be formed by any conventional material removal process discussed herein, where opening 110 is formed from inner surface 130 of housing 102 to outer surface 108 of housing 102. Opening 110 may ultimately form battery charging port (see, item 112 of FIG. 4J). Opening 110 formed through housing 102, as shown in FIG. 4B, may correspond to operation 202 of FIG. 2. Additionally, housing 102 including opening 110, as shown in FIG. 4B may correspond to operation 302 of FIG. 3.

As a result of forming opening 110 initially through inner surface 130 to outer surface 108 of housing 102, a bur 134 may be formed on outer surface 108. As shown in FIG. 4B, bur 134 may substantially surround and may be in alignment with opening 110. In some cases, the burr 134 is located along a portion of the edge of the opening 110. Bur 134 positioned on outer surface 108 of housing 102, may be formed from the material forming housing 102 and may be formed as a result of the material removal process for forming opening 110. That is, bur 134 may be formed from a portion of the material forming housing 102 that may not be completely or cleanly removed when forming opening 110 through housing 102. The burr 134 may protrude from the outer surface 108, as shown in FIG. 4B and/or may also protrude into the void formed by the opening 110.

As shown in FIG. 4B, and as discussed herein, opening 110 forming battery charging port 112 (see, FIG. 4J) may include port edge 126 formed on housing 102. More specifically, opening 110 forming battery charging port 112 may include port edge 126 formed on outer surface 108 of housing 102 for electronic device 100. As discussed herein, it may be desired that port edge 126 be substantially sharp once housing 102 is formed and implemented within electronic device 100.

FIG. 4C shows the beginning process of disposing a curable material 135 within opening 110 of housing 102. More specifically, curable material 135 may be disposed within opening 110 from inner surface 130 of housing 102 to outer surface 108 of housing 102. The beginning process of disposing curable material 135 within opening 110 of housing 102, as shown in FIG. 4C, may correspond to operation 204 of FIG. 2. As discussed herein, curable material 135 may include a material that may be substantially malleable, and capable of being cured to have desired hardness characteristics. In a non-limiting example, curable material 135 may include a material having a viscosity of approximately 25,000 centipoise (cP) when uncured, and may also have a durometer hardness of approximately 55 D when cured. In the non-limiting example, curable material 135 may include arcrylated urethane. However, it is understood that the viscosity, hardness and/or material composition of curable material 135 may vary and may depend on a variety of factors including, but not limited to: the material composition of housing 102, the dimension of opening 110, the process of disposing the curable material 135 within opening 110, and the process for removing the adaptive plug (see, FIG. 4E) formed from curable material 135. As such, the viscosity, hardness and/or material composition of curable material 135 may be distinct from those characteristics and materials provided above. In additional non-limiting examples, curable material 135 may include one of the following materials: ultraviolet curable resin, thermo-curable resin, injection molded polymer, thermoplastics, photopolymers, and epoxy.

Additionally as discussed herein, curable material 135 may be disposed within opening 110 of housing 102 using a variety of processes. In a non-limiting example, curable material 135 may be locally applied within opening 110 of housing 102. More specifically, a dispensing nozzle (not shown) may be positioned within opening 110, adjacent inner surface 130, and may gradually fill opening 110 with curable material 135 from inner surface 130 to outer surface 108 of housing 102 (see, FIGS. 4C-4E). By disposing curable material 135 within opening 110 from inner surface 130 to outer surface 108, the likelihood of air bubbles being formed in curable material 135 may be substantially reduced and/or eliminated. It is understood that air bubbles formed in curable material 135 may structural weaken adaptive plug 136 formed from curable material 135, and/or may negatively affect adaptive plug's 136 ability to protect and/or form a barrier around port edge 126 of housing 102.

In additional non-limiting example, and as discussed herein, curable material 135 may be disposed within opening 110 of housing 102 by: spraying curable material 135 within opening 110, immersing a portion of the housing 102 including opening 110 within a supply of curable material 135 to fill opening 110, and injection molding curable material 135 within opening 110. In another non-limiting example, curable material 135 may be three-dimensionally (3D) printed within opening 110 of housing 102. The process in which curable material 135 is disposed within opening 110 of housing 102 may be dependent on a variety of characteristics including, but not limited to: the material composition of curable material 135, the material composition of housing 102, the size of opening 110, and the process for removing adaptive plug 136 formed from curable material 135.

As shown in FIG. 4C, a bead portion 138 of curable material 135 may be initially formed on inner surface 130 of housing 102. Bead portion 138 of curable material 135 may be formed on inner surface 130 of housing 102 by depositing a portion of curable material 135 on inner surface 130 around opening 110. As a result of curable material's 135 viscosity, bead portion 138 may be formed as a result of the surface tension between curable material 135, inner surface 130 and opening 110 formed through housing 102. As discussed herein, bead portion 138 formed on inner surface 130 of housing 102 may aid in fixing adaptive plug 136 formed from curable material 135 within opening 110 when subsequent surface treatment processes are performed on housing 102.

Bead portion 138 may not always be formed on inner surface 130 of housing 102. That is, in an additional non-limiting example (see, FIGS. 6A-6G), bead portion 138 may not be positioned on inner surface 130 of housing 102, and a portion of curable material 135 may be formed within opening 110 adjacent inner surface 130. The forming of bead portion 138 on inner surface 130 of housing 102 may be dependent on a variety of factors including, but not limited to: the material composition of curable material 135, the material composition of housing 102, the size of opening 110, the process for disposing curable material 135 within opening 110, and the process for removing adaptive plug 136 formed from curable material 135. As shown in FIG. 4C, bead portion 138 may be formed on inner surface 130 as a result of the small size of opening 110. That is, and as discussed herein, because opening 110 of housing 102 is relatively small and includes minimal surface area (e.g., sidewalls 128) for contacting/coupling to curable material 135 forming adaptive plug 136, curable material 135 may be deposited on inner surface 130 to form bead portion 138. Bead portion 138 formed on inner surface 130 of housing 102 may aid in fixing adaptive plug 136 within opening 110 during subsequent surface treatment processes, as discussed herein.

FIG. 4D shows one example of the completed process of disposing a curable material 135 within opening 110 of housing 102. More specifically, curable material 135 may be disposed completely within opening 110, and bead portion 138 may be formed on outer surface 108 of housing 102. The completed process of disposing curable material 135 within opening 110 of housing 102, as shown in FIG. 4D, may correspond to operation 204 of FIG. 2. As similarly discussed here within respect to bead portion 138 formed on inner surface 130, bead portion 138 may be formed on outer surface 108 as a result of the viscosity of curable material 135 and/or the surface tension between curable material 135, outer surface 108, and opening 110 formed through housing 102. As discussed herein, bead portion 138 formed on outer surface 108 of housing 102 may aid in protecting and/or forming a barrier for port edge 126 of opening 110 when subsequent surface treatment processes are performed on housing 102.

Additionally, as shown in FIG. 4D, bead portion 138 formed on outer surface 108 of housing 102 may substantially surround burs 134 formed on outer surface 108 of housing 102. As discussed herein, when curable material 135 is cured to form adaptive plug 136, bead portion 138 formed on outer surface 108, surrounding burs 134, may become coupled to burs 134 to aid in fixing adaptive plug 136 within opening 110.

FIG. 4E shows the formation of adaptive plug 136 subsequent to performing a curing process on curable material (see, item 135 of FIG. 4D) positioned within opening 110 (see, item 110 of FIG. 4C) of housing 102. More specifically, adaptive plug 136 may be formed by curing curable material 135, such that adaptive plug 136 is positioned within opening 110 of housing 102. Additionally, as shown in FIG. 4E, adaptive plug 136 may include bead portions 138 formed on inner surface 130 and outer surface 108 of housing 102. The curing of curable material 135 to form adaptive plug 136 within opening 110 of housing 102, as shown in FIG. 4E, may correspond to operation 206 of FIG. 2. Additionally, the forming of adaptive plug 136 within opening 110 of housing 102, as shown in FIG. 4E, may correspond to operation 304 in FIG. 3.

As shown in FIG. 4E, adaptive plug 136 may include bead portions 138 formed on inner surface 130 and outer surface 108 of housing 102, and an opening portion 140 positioned within opening 110. As discussed herein, bead portion 138 formed on inner surface 130 may aid in fixing adaptive plug within opening 110, and bead portion 138 formed on outer surface 108 may aid protecting and/or forming a barrier for edge 126 of opening 110. Opening portion 140 of adaptive plug 136 may be positioned within opening 110 and may be coupled to or contact sidewalls 128 (see, FIG. 4C) of opening 110. That is, opening portion 140 of adaptive plug 136 may include circumference or area substantially equal to a circumference or area of opening 110 to aid in fixing adaptive plug 136 within opening 110. Additionally, opening portion 140 coupled to or contacting sidewalls 128 of opening 110 may substantially protect sidewalls 128 from being exposed to subsequent surface treatment processes performed on housing 102, as discussed herein.

As shown in enlarged insert portion of FIG. 4E, adaptive plug 136 may encapsulate the burr and form a substantial seal and/or form a barrier around the portions of housing 102 which adaptive plug 136 contacts. That is, as shown in enlarged insert portion of FIG. 4E, adaptive plug 136 may be positioned within opening 110 such that opening portion 140 completely contacts (e.g., no gaps or spaces) sidewalls 128 of opening 110. Additionally, bead portion 138 of adaptive plug 136 position on outer surface 108 may completely contact burs 134 and may be positioned adjacent to and substantially over edge 126 of opening 110. By positioning adaptive plug 136 substantially over edge 126 of opening 110, edge 126 may not be exposed and/or adaptive plug 136 may form a barrier on edge 126 to protect edge 126 during subsequent surface treatment processes, as discussed herein. The positioning and/or forming of the barrier on edge 126 by adaptive plug 136 positioned within opening 110, as shown in FIG. 4E, may correspond to operation 306 in FIG. 3.

Figure 4F:
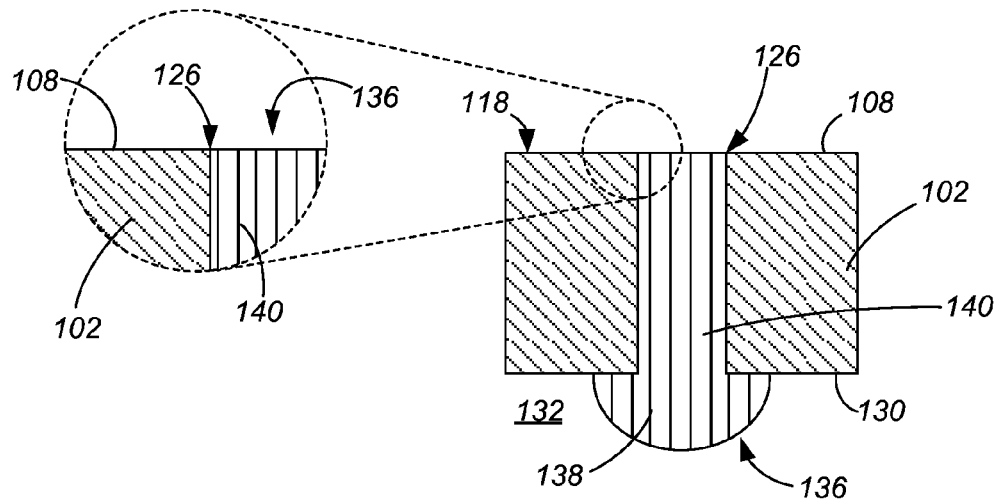
Figure 4G:
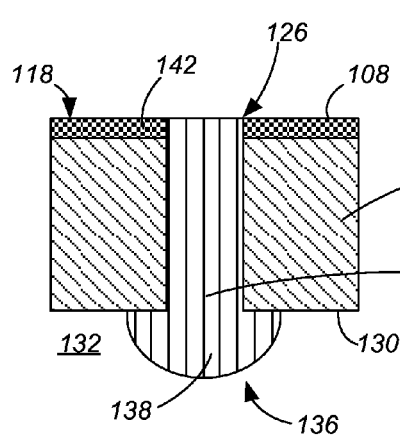

FIGS. 4F and 4G show surface treatments being performed on housing 102. More specifically, FIG. 4F shows the process of removing bur 134 formed on outer surface 108 of housing 102 and FIG. 4G shows the process of polishing outer surface 108 of housing 102. The surface treatments performed on outer surface 108 of housing 102, as shown in FIGS. 4F and 4G, may correspond to operation 208 of FIG. 2.

As shown in FIG. 4F, bur 134 of housing 102 may be removed from the housing 102 and bead portion 138 of adaptive plug 136 formed on outer surface 108 may be removed from housing 102. Bur 134 formed around opening 110 and bead portion 138 of adaptive plug 136 may be removed from outer surface 108 of housing 102 using any conventional material removal technique(s). In an non-limiting example, a milling process may be performed on outer surface 108 of housing 102 to remove bur 134 formed around opening 110 and bead portion 138 of adaptive plug 136. A portion of the outer surface 108 of the housing 102 may also be removed by this operation.

As a result of removing bur 134 and bead portion 138 formed on housing 102, outer surface 108 of housing 102 and opening portion 140 of adaptive plug 136 may be in planar alignment. Additionally, as shown in FIG. 4F, port edge 126 of opening 110 forming battery charging port 112 (see, FIG. 4J) may be substantially formed. That is, port edge 126 of opening 110 may no longer be obstructed by bur 134 formed on outer surface 108 of housing 102. As shown in enlarged insert portion of FIG. 4F, adaptive plug 136 may continue to provide a barrier and/or may protect port edge 126 of opening 110 during the surface treatment process. That is, as shown in enlarged insert portion of FIG. 4F, opening portion of adaptive plug 136 may remain in contact with port edge 126 and sidewalls 128 of opening 110 during the performance of the surface treatment process on outer surface 108 of housing 102. By remaining in contact, and including such a hard material that may not be worn away, adaptive plug 136 positioned within opening 110 may substantially maintain the sharp edge of port edge 126. More specifically, as a result of positioning adaptive plug 136 in opening 110 while surface treatment processes are performed on outer surface 108 of housing 102, port edge 126 of opening 110 may not be exposed to the surface treatments, and ultimately, no material may be removed from port edge 126 of opening 110 during the surface treatment process.

As shown in FIG. 4G, a polishing process may be performed on housing 102. Specifically, as shown in FIG. 4G, a polishing process may be performed on outer surface 108 of housing 102, such that a polished portion 142 of outer surface 108 may be exposed. As discussed herein, other non-limiting examples of surface treatments that may be performed on outer surface 108 of housing 102 may include buffing outer surface 08 of housing 102 and sand blasting outer surface 108 of housing 102. As a result of adaptive plug's 136 hardness, a plurality of surface treatment processes may be performed on outer surface 108, without negatively affecting adaptive plug 136 and port edge 126 of opening 110.

Figure 4H:
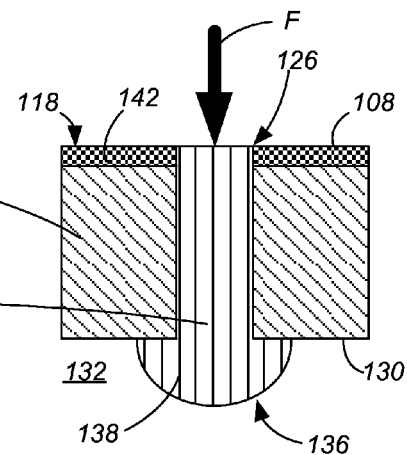
Figure 4I:
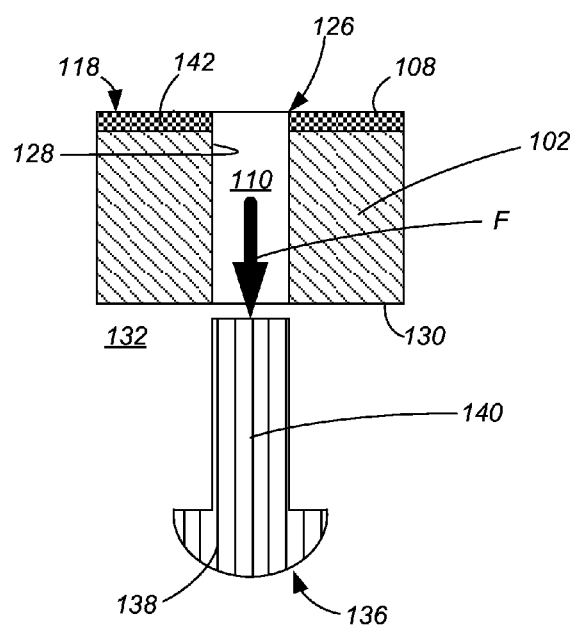

As shown in FIGS. 4H and 4I, adaptive plug 136 may be removed from opening 110 of housing 102. More specifically, in a non-limiting example as shown in FIGS. 4H and 4I, a force (F) may be applied to adaptive plug 136 adjacent outer surface 108, in order to remove adaptive plug 136 through inner surface 130. The removal of adaptive plug 136 from opening 110 of housing 102, as shown in FIGS. 4H and 4I, may correspond to operation 210 of FIG. 2. As discussed herein, prior to applying the force (F) to remove adaptive plug 136 from opening 110, housing 102 may be exposed to a liquid to aid in the removal of adaptive plug 136. The liquid used to aid in the removal may be dependent upon the material used to form adaptive plug 136. In an non-limiting example where adaptive plug 136 is formed from arcrylated urethane, the liquid may include warm water, which may ultimately soft adaptive plug 136. Once softened, the force (F) may be applied to adaptive plug 136, and adaptive plug 136 may ultimately be peeled from opening 110 of housing 102 through inner surface 130. More specifically, the bond or coupling between sidewalls 128 of opening 110 and opening portion 140 of adaptive plug 136 may become weakened when housing 102 including adaptive plug is exposed to the liquid. As such, adaptive plug 136 may be peeled or pulled through opening 110 at inner surface 130 of housing 102.

Figure 4J:
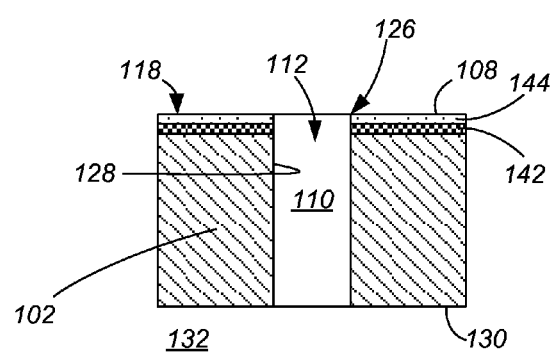

FIG. 4J shows housing 102 including battery charging port 112. More specifically, FIG. 4J shows housing 102 including battery charging port 112 having a substantially sharp port edge 126 formed on outer surface 108 of housing 102. As discussed herein, substantially sharp port edge 126 may be formed as a result of including adaptive plug 136 (see, FIGS. 4E-4I) in the formation of housing 102.

FIG. 4J also shows housing 102 subsequent to a fine buffing process being performed on outer surface 108. More specifically, a fine buffing process may be performed on outer surface 108 of housing 102 just prior to housing 102 being utilized within electronic device 100 (see, FIG. 1B). The fine buffing process may remove debris and/or minimal material from housing 102, and may provide outer surface 108 of housing within a buffed portion 144 over the polished portion 142. As a result of the minimal material removal accomplished by the fine buffing process, port edge 126 of opening 110 forming battery charging portion 112 may remain substantially sharp without the need for adaptive plug 136 to be positioned within opening 110. The fine buffing process of outer surface 108 of housing 102, as shown in FIG. 4J, may correspond to optional operation 212 in FIG. 2.

Figure 5A:
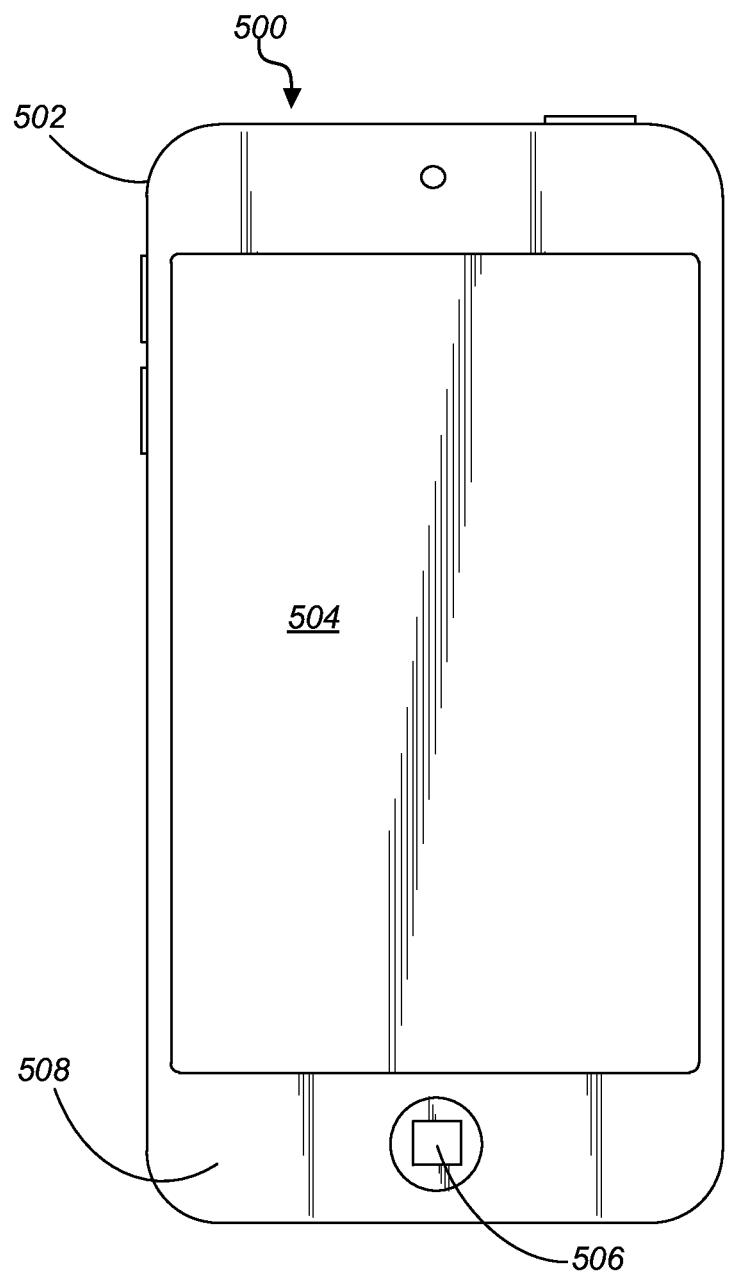
FIG. 5A shows an illustrative front view of an electronic device according to additional embodiments.
Figure 5B:
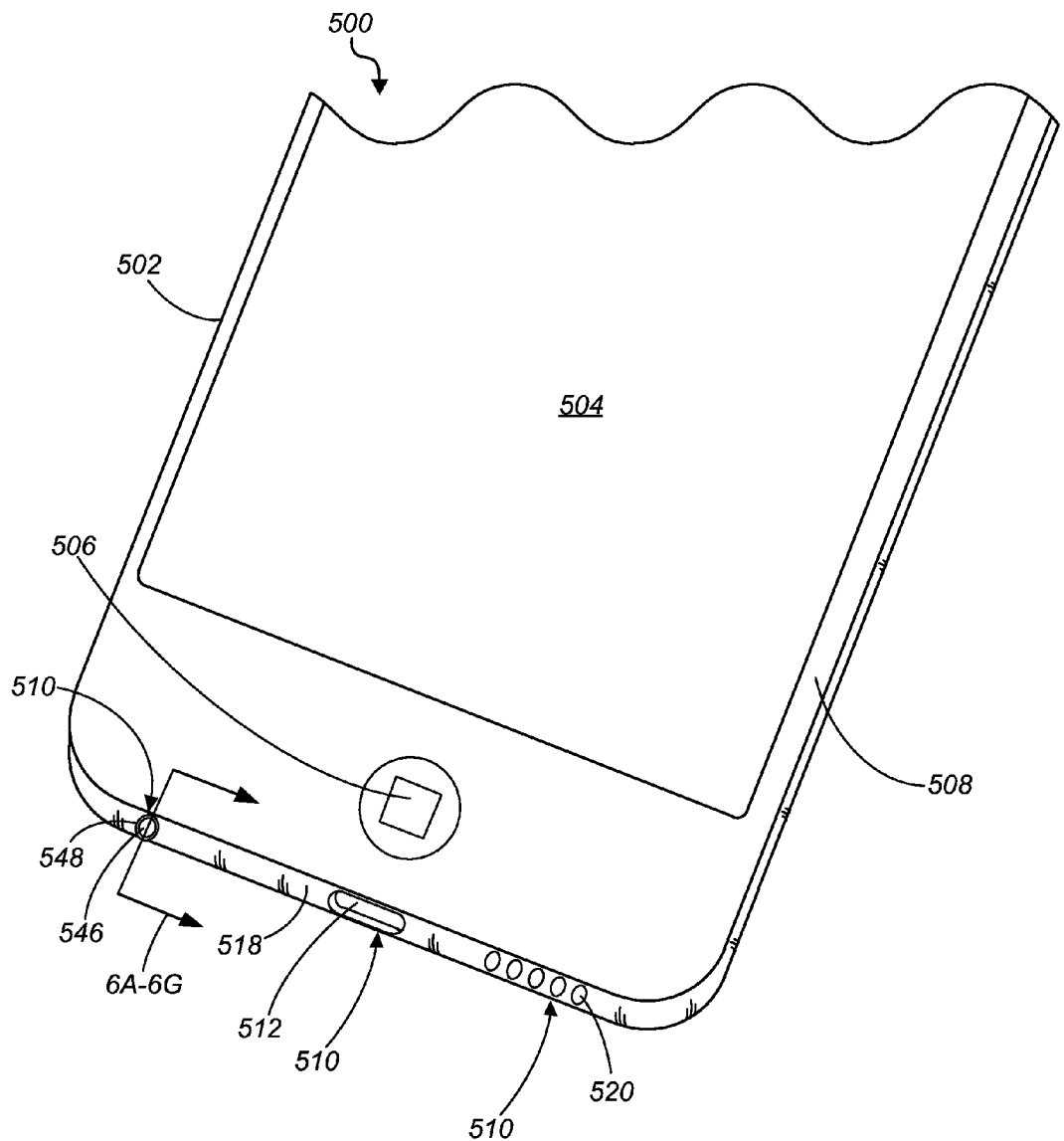
FIG. 5B shows an illustrative perspective view of the electronic device of FIG. 5A, according to additional embodiments.

FIGS. 5A and 5B show a distinct electronic device 500, according to additional embodiments. Electronic device 500, as shown in FIGS. 5A and 5B, may be distinct from electronic device 100 shown in FIGS. 1A and 1B, and may configured as a media player. Although distinct from electronic device 100, electronic device 500 of FIGS. 5A and 5B may include substantially similar components as electronic device 100. More specifically, electronic device 500 may include a housing 502, a display 504, at least one button 506, openings 510 formed through bottom portion 518, battery charging port 512, speaker 520, and other features. It is understood that similarly named components or similarly numbered components may function in a substantially similar fashion, may include similar materials and/or may include similar interactions with other components. Redundant explanation of these components has been omitted for clarity.

Electronic device 500 may include distinct features and/or components as electronic device 100 (see, FIG. 1B). As shown in FIG. 5B, and with comparison to FIG. 1B, electronic device 500 may include substantially curved portions of housing 502. More specifically, as shown in FIG. 5B, bottom portion 518 of housing 502 may be substantially curved. That is, outer surface 508 of bottom portion 518 of housing 502 may be substantially curved on electronic device 500. Bottom portion 518 may be substantially curved by design for aesthetic purposes.

Additionally as shown in FIG. 5B, and with comparison to FIG. 1B, electronic device 500 may include headphone port 546. More specifically, an opening 510 may be formed through curved, bottom portion 518 of housing 502 in order to form headphone port 546 within electronic device 500. Headphone port 546 may be in coupled to an headphone system (not shown) positioned within housing 502, and may be configured receive a headphone jack (not shown) for allowing a user to listen to electronic device 500 audio via personal headphone. The headphone system coupled to headphone port 546 may include any conventional electronic audio system typically used within electronic devices.

Headphone port 546 may include headphone port edge 548 positioned on outer surface 508 of curved bottom portion 518. Similar to port edge 126 of battery charging port 112 in FIG. 1B, headphone port edge 548 of headphone port 546 may be designed to include a substantially sharp edge. However, distinct from port edge 126 (see, FIG. 1B), headphone port edge 548 may be formed on a curved surface (e.g., curved bottom portion 518) of housing 502 for electronic device 500. As discussed herein, headphone port edge 548 may include a substantially sharp edge for function and/or aesthetic purposes.

Turning to FIGS. 6A-6G, with continued reference to FIGS. 5A and 5B, a housing 502 undergoing various operations of method 200 of FIG. 2, and method 300 of FIG. 3 may be depicted. That is, FIGS. 6A-6G may depict the formation of headphone port 546 in housing 502 for electronic device 500 (see, FIGS. 5A and 5B) using adaptive plug 136 (see, FIG. 6C), according to the method 200 of FIG. 2 and the method 300 of FIG. 3. FIGS. 6A-6G show an illustrative cross-section view of housing 502 of electronic device 500 taken along line 6A-6G in FIG. 5B. It is understood that similarly numbered components may function in a substantially similar fashion. Redundant explanation of these components has been omitted for clarity. Additionally, it is understood that housing 502 may undergo substantially similar processes as housing 102, as discussed herein with respect to FIGS. 4A-4J. As such, redundant explanation of these processes has been omitted for clarity.

FIG. 6A shows a portion of a material forming housing 502 of electronic device 500 prior to any processing. As shown in FIG. 6A, as discussed herein, bottom portion 518 of housing 502 may be substantially curved. In a non-limiting example, the material shown in FIG. 6A for forming housing 502 for electronic device 500 may be ceramic zirconia.

FIG. 6B shows housing 502 including opening 510. Opening 510 may be formed completely through housing 502 using any conventional material removal process. As discussed herein, opening 510 may be formed from inner surface 530 to outer surface 508 of curved, bottom portion 518 of housing 502. As a result, bur 534 may be formed on outer surface 508 of curved, bottom portion 518 and may substantially surround and/or be aligned with opening 510. Opening 510 formed through housing 502, as shown in FIG. 6B, may correspond to operation 202 of FIG. 2. Additionally, housing 502 including opening 510, as shown in FIG. 6B, may correspond to operation 302 of FIG. 3.

FIG. 6C shows the process of disposing curable material 535 within opening 510 of housing 502. Curable material 535 may be disposed within opening 510 in similar processes as discussed herein with respect to FIG. 4C. Additionally, the process of disposing curable material 535 within opening 510, as shown in FIG. 6C, may correspond to operation 204 of FIG. 2.

With comparison to FIG. 4C, and as discussed herein, curable material 535 may be disposed within opening 510 without the formation of bead portion 538 (see, FIG. 6D) on inner surface 530 of housing 502. That is, as shown in FIG. 6C, curable material 535 may be deposited adjacent to, but not directly on inner surface 530 of housing 502, and as such, may not form bead portion 538 on inner surface 530 of housing 502. With comparison to battery charging port 112 of FIG. 4C, opening 510 used to form headphone port 546 may be substantially large, and may include a larger surface area (e.g., sidewalls 528) for contacting and/or being coupled to adaptive plug 536 formed from curable material 535. As a result of the increased surface area to contact adaptive plug 536 within opening 510, adaptive plug 536 formed from curable material 535 may be fixed within opening 510 without the need for bead portion 538 on inner surface 530. As such, curable material 535 may not be disposed onto inner surface 530 of housing 502.

FIG. 6D shows the formation of adaptive plug 536 subsequent to performing a curing process of curable material 535 (see, FIG. 6C) positioned within opening 510 of housing 502. More specifically, adaptive plug 536 may be formed by curing curable material 535, such that adaptive plug 536 is positioned within opening 510 of housing 502. Additionally, as shown in FIG. 6D, adaptive plug 536 may include bead portions 538 formed on outer surface 508 of curved bottom portion 518 of housing 502. The curing of curable material 535 to form adaptive plug 536 within opening 510 of housing 502, as shown in FIG. 6D, may correspond to operation 206 of FIG. 2. Additionally, the forming of adaptive plug 536 within opening 510 of housing 502, as shown in FIG. 6D, may correspond to operation 304 in FIG. 3.

As similarly discussed herein with respect to FIG. 4E, adaptive plug 536 may include bead portion 538 formed on outer surface 508, that may be coupled to bur 534. Additionally, as discussed herein, adaptive plug 536 may form a seal and/or form a barrier around the portions of housing 502 which adaptive plug 536 contacts. More specifically, adaptive plug 536 may form a barrier on headphone port edge 548 of opening 510 forming headphone portion 546, and sidewalls 528 of opening 510.

Figure 6E:
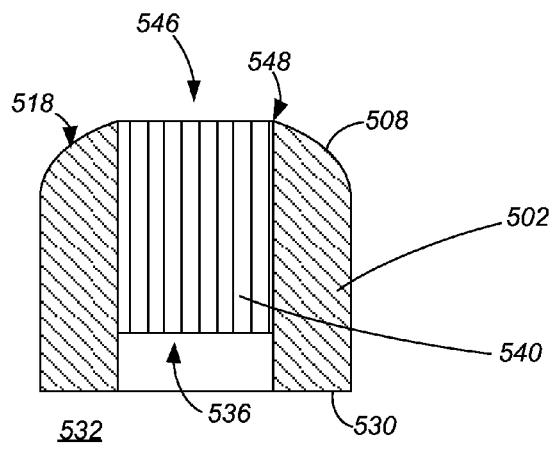

FIG. 6E shows a surface treatment being performed on housing 502. More specifically, FIG. 6E shows the process of removing (e.g., milling) bur 134 formed on outer surface 508 of curved, bottom portion 518 of housing 102, and removing bead portion 538 of adaptive plug 536. As similarly discussed herein with respect to FIG. 4F, the surface treatment performed on outer surface of curved, bottom portion 518 of housing 502, as shown in FIG. 6E, may correspond to operation 208 of FIG. 2.

Figure 6F:
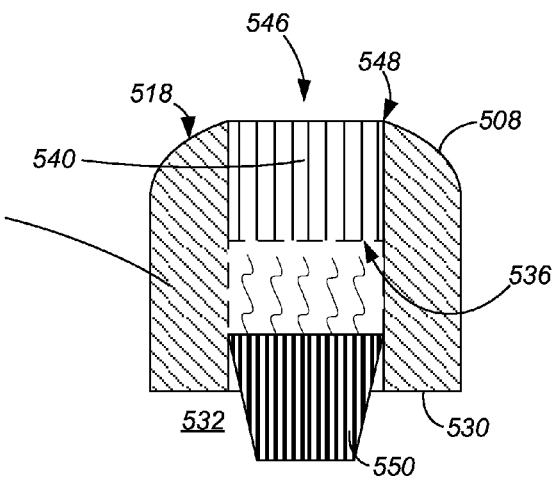

FIG. 6F shows adaptive plug 536 being removed from opening 510 of housing 502. More specifically, and distinct from the removal process discussed herein with respect to FIGS. 4H and 4I, adaptive plug 536 may be removed by burning adaptive plug 526 from opening 510 of housing 502. In the non-limiting example, housing 502 may be made from ceramic zirconia, which includes a melting temperature significantly higher than the arcrylated urethane used to form adaptive plug 536. As such, a heat source 550 may utilized to burn adaptive plug 536 from opening 510. As shown in FIG. 6F, heat source 550 may include a laser positioned within opening 510, through inner surface 530, that may expose adaptive plug 536 to a laser beam that may burn or incinerate the adaptive plug 536. As a result, the removal process of adaptive plug 536, as shown in FIG. 6F, may be accomplished by burning adaptive plug 536 from opening 510 of housing 502, without negatively effecting housing 502 by exposure to heat source 550 (e.g., laser). The removal of adaptive plug 536 from opening 510 of housing 502, as shown in FIG. 6F, may correspond to operation 210 of FIG. 2.

Figure 6G:
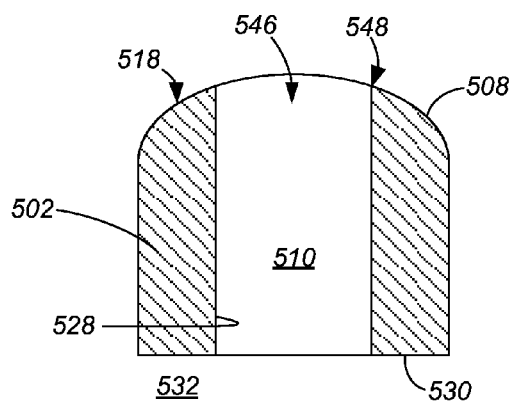

FIG. 6G shows housing 502 including headphone port 546. More specifically, housing 502, as shown in FIG. 6G, may include headphone port 546 including a substantially sharp headphone port edge 548 formed on outer surface 508 of curved, bottom portion 518 of housing 502. Within comparison to FIG. 4J, housing 502 of FIG. 6G may not include a fine buffing portion, as accomplished by performing a fine buffing process, as discussed in optional operation 212 in FIG. 2. As such, once adaptive plug 536 is removed from opening 510 forming headphone port 546 in housing 502, housing 502, as shown in FIG. 6G may be utilized by electronic device 500.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

We claim:

1. A method of forming a housing, comprising:
    forming an opening within the housing and causing a bur to be formed on an outer surface of the housing;
    disposing a curable material within a portion of the opening of the housing and forming a bead portion of the curable material on the outer surface of the housing, wherein the bead portion is coupled to the bur;
    curing the material to form an adaptive plug, wherein the adaptive plug is positioned within the opening of the housing;
    performing at least one surface treatment on the housing, the at least one surface treatment comprising one or more of polishing the outer surface of the housing; buffing the outer surface of the housing; and sand blasting the outer surface of the housing; and
    removing the bead portion of the adaptive plug, the bead portion positioned on the outer surface of the housing.

2. The method of claim 1, wherein the forming of the opening within the housing further comprises:
    machining the opening through the housing from an inner surface of the housing to the outer surface of the housing
    such that the bur is in alignment with the opening.

3. The method of claim 2, wherein the disposing of the curable material within the portion of the opening of the housing further comprises dispensing the curable material within the opening from the inner surface of the housing to the outer surface of the housing.

4. The method of claim 1, further comprising removing the adaptive plug formed within the opening of the housing.

5. The method of claim 4, wherein the removing of the adaptive plug formed within the opening of the housing further comprises removing the plug from the opening of the housing through the inner surface of the housing.

6. The method of claim 4, wherein the removing of the adaptive plug formed within the opening of the housing further comprises:
    exposing the housing and the adaptive plug to a liquid;
    applying a force to the adaptive plug positioned within the opening of the housing; and
    peeling the adaptive plug from the opening of the housing.

7. The method of claim 4, wherein the removing of the adaptive plug formed within the opening of the housing further comprises burning the adaptive plug from the opening of the housing.

8. The method of claim 4, further comprising:
    in response to removing the adaptive plug formed within the opening of the housing, performing a fine buffing process on the housing including the opening.

9. The method of claim 1, wherein the disposing of the curable material within the opening of the housing further comprises one of:
    spraying the curable material within the opening of the housing;
    dunking the housing including the opening within a supply of the curable material; or
    locally applying the curable material within the opening of the housing.

10. A method of forming a housing, comprising:
    removing a portion of the housing to define an aperture within the housing, wherein the removing creates a bur on a top surface of the housing;
    disposing a curable material within a portion of the aperture and forming a bead portion of the curable material on the to surface of the housing, thereby coupling the bead portion of the curable material to the bur;
    curing the curable material to form an adaptive plug disposed within the aperture;
    mechanically treating the top surface of the housing by performing at least one of:
    polishing the top surface of the housing;
    buffing the top surface of the housing; and
    sand blasting the top surface of the housing; and
    separating the bead portion of the adaptive plug from the top surface of the housing.

11. The method of claim 10, wherein the curable material is substantially malleable.

12. The method of claim 10, wherein the curing comprises curing the curable material using ultraviolet light.

13. The method of claim 10, wherein the curing comprises curing the curable material by increasing a temperature of the curable material.

14. The method of claim 10, wherein the removing of the portion of the housing further comprises:
    machining the aperture through the housing from an inner surface of the housing to the top surface of the housing such that the bur is aligned with the aperture.

15. The method of claim 14, wherein the disposing of the curable material within the portion of the aperture further comprises dispensing the curable material within the aperture from the inner surface of the housing to the top surface of the housing.

16. A method of forming a housing, comprising:
    generating a hole within the housing such that a bur is formed on an exterior surface of the housing;
    depositing a curable material along a contour of the hole and forming a bead portion of the curable material on the exterior surface of the housing, wherein the bead portion of the curable material is affixed to the bur;
    hardening the material to define an adaptive plug positioned within the hole;
    modifying a surface texture of the housing by at least one of:
        polishing the exterior surface of the housing;
        buffing the exterior surface of the housing; and
        sand blasting the exterior surface of the housing; and
    detaching the bead portion of the adaptive plug from the exterior surface of the housing.

17. The method of claim 16, wherein the hole comprises one of:
    a through hole;
    a blindhole; or
    a counter bore.

18. The method of claim 16, wherein the depositing of the curable material further comprises three-dimensionally (3D) printing the adaptive plug with the hole.

19. The method of claim 16, further comprising removing the adaptive plug formed within the hole.

20. The method of claim 19, wherein the removing of the adaptive plug formed within the hole further comprises removing the plug from the hole of the housing through the inner surface of the housing.

21. The method of claim 16, wherein the depositing of the curable material within the hole of the housing further comprises one of:
    spraying the curable material within the hole of the housing;
    submerging the hole within a supply of the curable material; or
    locally applying the curable material within the hole of the housing.

* * * * *

UNITED STATES PATENT AND TRADEMARK OFFICE
CERTIFICATE OF CORRECTION

| | | |
|---|---|---|
| PATENT NO. | : 9,451,065 B2 | Page 1 of 1 |
| APPLICATION NO. | : 14/244297 | |
| DATED | : September 20, 2016 | |
| INVENTOR(S) | : Van Asseldonk et al. | |

It is certified that error appears in the above-identified patent and that said Letters Patent is hereby corrected as shown below:

In the Claims

In column 18, at line 52, delete "to" and insert --top--.

Signed and Sealed this
Eighth Day of November, 2016

Michelle K. Lee
*Director of the United States Patent and Trademark Office*